United States Patent [19]

Spliethoff

[11] Patent Number: 5,191,845
[45] Date of Patent: Mar. 9, 1993

[54] METHOD OF REPROCESSING SEWAGE SLUDGE

[75] Inventor: Heinz Spliethoff, Friedrichsthal, Fed. Rep. of Germany

[73] Assignee: Saarbergwerke Aktiengesellschaft, Saarbrucken, Fed. Rep. of Germany

[21] Appl. No.: 743,325

[22] PCT Filed: Mar. 9, 1990

[86] PCT No.: PCT/DE90/00175
§ 371 Date: Aug. 22, 1991
§ 102(e) Date: Aug. 22, 1991

[87] PCT Pub. No.: WO90/12249
PCT Pub. Date: Oct. 18, 1990

[51] Int. Cl.[5] ............................ F23G 5/00; F23G 7/00
[52] U.S. Cl. .................................. 110/346; 110/224; 110/229
[58] Field of Search ................. 110/346, 238, 244

[56] References Cited

U.S. PATENT DOCUMENTS

| 4,583,470 | 4/1986 | Hirose . | |
|---|---|---|---|
| 4,656,955 | 4/1987 | Kuo | 110/224 |
| 4,760,650 | 8/1988 | Theliander et al. | 110/224 |
| 4,930,429 | 6/1990 | Ryham | 110/229 |
| 4,938,155 | 7/1990 | Williams | 110/224 |

FOREIGN PATENT DOCUMENTS

| 0305779 | 3/1989 | European Pat. Off. . |
| 3537595 | 4/1987 | Fed. Rep. of Germany . |
| 3542004 | 6/1987 | Fed. Rep. of Germany . |
| 1577543 | 10/1980 | United Kingdom . |

Primary Examiner—Henry C. Yuen
Attorney, Agent, or Firm—James Creighton Wray

[57] ABSTRACT

In a method of reprocessing sewage sludge in which the sludge is dried before it is burnt, it is proposed to use steam from the water-steam circuit of a fossil-fueled power station process as the heating medium for drying and to take the vapors arising during drying into a fire chamber downstream of the power station furnace to reduce nitrogen oxides. The dried sewage sludge is preferably burnt together with coal in the power station furnace.

10 Claims, 1 Drawing Sheet

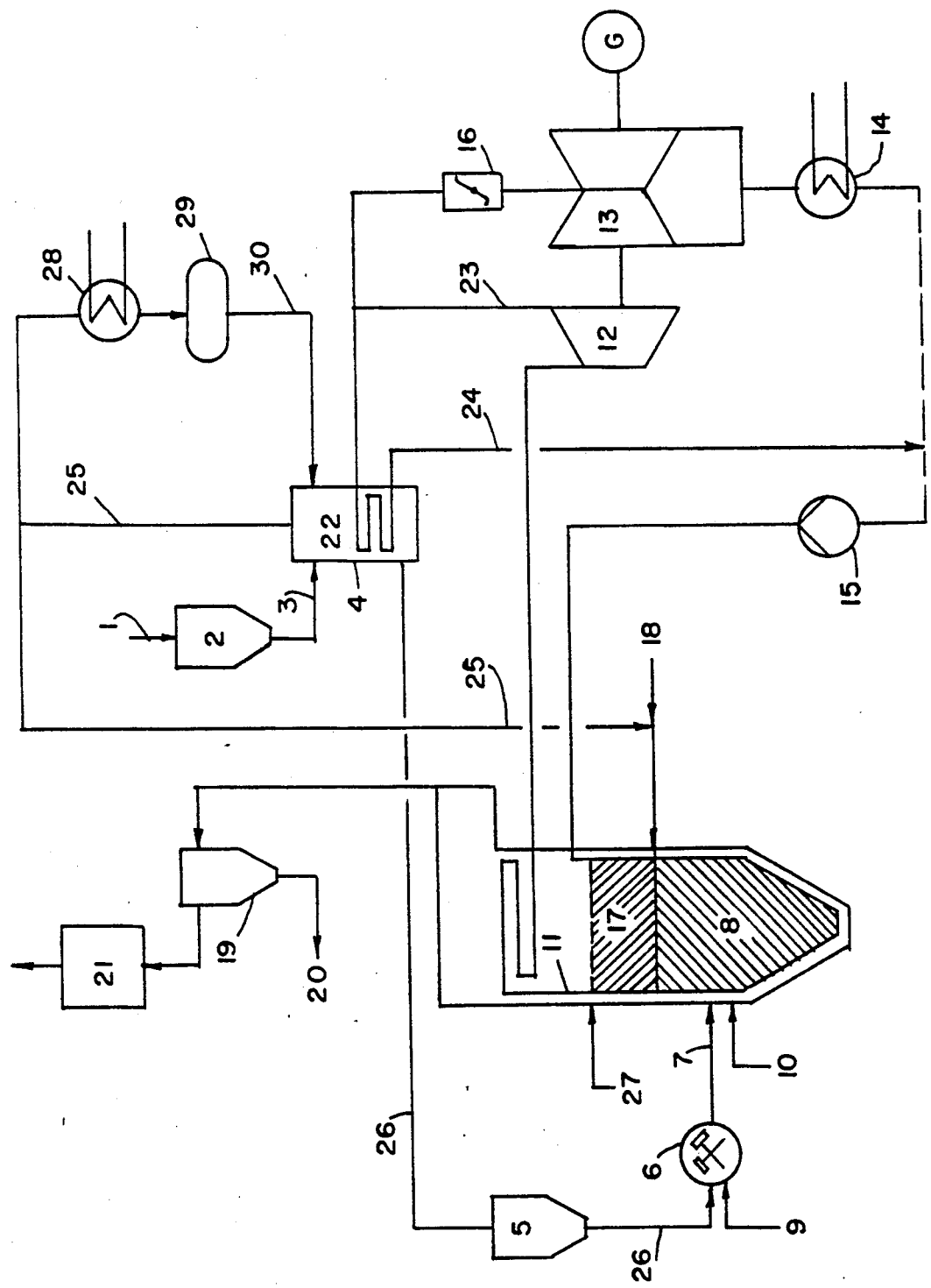

METHOD OF REPROCESSING SEWAGE SLUDGE

BACKGROUND OF THE INVENTION

The invention relates to a process for the reprocessing of sewage sludge.

Because of its organic components, the reprocessing of sewage sludge is performed mostly by combustion whereby the very high water content proves, however, to be a great impairment to the combustion process.

Thus, it has already been suggested that, prior to its combustion, the sewage sludge be subjected to a mechanical partial dehydration or that the sewage sludge be mixed with corresponding volumes of a dry fuel. Both methods have the disadvantage that heat required for the evaporation of the still large volume of residual water is provided disadvantageously at an unnecessarily high temperature level during the combustion.

Thus, it has also already been suggested that the sewage sludge be subjected to a thermal drying prior to its combustion. For this reason, atmospheric fluidized bed dryers e.g. have been introduced in which the heat necessary for the drying process is generated in an atmospheric fluidized bed combustor and is added to the fluidized bed dryer via an intermediate heat transfer cycle. The exhaust vapors produced during the drying process are recycled in part as a carrier medium for the fluidized bed into the fluidized bed dryer and are, for the remainder, condensed outside the installation and are processed correspondingly as an exhaust vapor condensate. Disadvantages of this known process are the relatively high expenditure for process-specific installation parts such as exhaust vapor purifier, exhaust vapor concentrator, exhaust vapor condenser, exhaust vapor condensate processor, and generation and transfer of the required drying heat via pipe walls which are in contact with the exhaust vapors on both sides.

SUMMARY OF THE INVENTION

The invention is based on the task of developing a simple and economical process for the thermal reprocessing of sewage sludge.

According to the invention this task is solved in that the sewage sludge is dried first by indirect heat exchange with condensed steam from the water-steam cycle of a power plant process operated with fossil fuels; that the exhaust vapors produced during drying are passed into a combustion chamber downstream from the furnace zone of the steam generator of the power plant process in order to reduce the nitric oxides formed in the furnace zone and that the dried sewage sludge is burned.

The suggestion according to the invention permits both an economically and ecologically advantageous reprocessing of sewage sludge through close combination with a power plant process operated with fossil, i.e. solid, fluid, or gaseous fuels. In this way the drying heat required for the sewage sludge may be provided at the required temperature level in a simple manner through low temperature steam, e.g. in the form of drawn off steam which is essentially already worked off in a steam turbine and stems from the water-steam cycle of the power plant. In the case of sufficiently large sewage sludge water volumes it is possible to adjust the necessary temperature level in the dryer by means of the pressure of the steam which is used as heating medium, e.g. by way of a counter-pressure turbine or also with a regulated bleeding condensation turbine.

In the case of comparatively low sewage sludge water volumes the necessary heating steam may be taken from the bleeder at the temperature and pressure level suitable in each case. For this purpose the supplying bleeder may also be alternated by switchover.

The exhaust fumes produced during the drying of the sewage sludge contain, in addition to the water steam, combustible components and other organic compounds, e.g. nitrogen compounds. According to the invention, these exhaust fumes are fed under precisely defined conditions to a reduction zone which is downstream from the furnace zone of the fossil power plant process, in order to reduce the nitric oxides in the flue gas of the fossil power plants, possibly together with other reducing substances, such as reducing gases or reducing vapors. They react with the nitric oxides which are present in the flue gas, reducing them to molecular nitrogen in the process. The reduction zone is succeeded by the recombustion with recombustion air of the remaining combustible materials. The incombustible components of the exhaust fumes from the sewage sludge dryer leave the reduction zone together with the flue gas and are fed to the downstream installations of the power plant for flue gas purification. In this way an individual processing of the exhaust fumes in their own installations is not required according to the invention.

The infrastructure of the existing power plant process which is operated with fossil fuels may also be used advantageously during the combustion of the sewage sludge, if according to another characteristic of the invention the flue gases produced during the production of the dried sewage sludge are mixed with the flue gases of the fossil power plant process and are discharged from the power plant together with them. In as far as the fly ash produced during the combustion of the sewage sludge is harmless, the sewage sludge flue gas is mixed with the flue gases of the power plant process without prior dust separation so that the electric filters of the power plant may also be used for the separation of dust from the sewage sludge flue gas and the existing heating surfaces of the steam generator may be used for cooling the flue gases.

In the case that the fly ash produced during the combustion of the sewage sludge contains components which do not permit a mixing with the fly ash from the power plant process, another characteristic of the invention provides a prior separation of this ash. In this case the existing installations for the desulfurization and denitrogenation of the power plant flue gases may also be used for the flue gases from the sewage sludge combustion.

In particular, in cases when the sewage sludge ash or the fly ash produced during the sewage sludge combustion contains hazardous substances, e.g. heavy metals such as cadmium and lead, the sewage sludge may, for improved disposal, be simply melted in its own combustion chamber with correspondingly high combustion temperatures and/or in heat exchange with hot flue gas from the power plant process. Ash ceramized in this manner may be used as construction material or filling material without problems, or may also be discarded.

According to another characteristic of the invention, the cooling and melting of the ash or fly ash from the sewage sludge combustion may take place at various temperature levels which may be adjusted by quenching or corresponding cooling surfaces. This makes it possible to separate ash components with different melting temperatures.

It is particularly advantageous when according to another characteristic of the invention the dried sewage sludge itself is burned directly in the furnace zone of a coal power plant. This will especially be the case when the furnace zone is operated at temperatures above the melting points of the produced ash components. Hereby the grinding of the dried sewage sludge may be performed according to need either together with the coal or in its own mill.

In this case the sewage sludge ash is melted completely or in part together with the coal-derived ash and is removed as a granulate from the power plant and used otherwise. If the power plant process is based on a dry combustor, i.e. a combustor with temperatures below the ash melting point, the entire ash is removed together with the flue gas from the boiler and is separated in the individual zones of the electric filter. The known dust separation characteristics of an electric filter hereby result in a certain classification of the fly ash in the individual zones themselves, depending on the respective particle size.

Since the sewage sludge from the corresponding sewage plants as a rule is generated continuously, while fossil power plant processes, e.g. hard coal power plants, are operated only temporarily, i.e. in intermediate or even only in peak load operation, it is useful according to another characteristic of the invention to provide storage possibilities both for the fresh raw sewage sludge and/or the dried sewage sludge and/or then condensed exhaust vapors from the sewage sludge dryer in order to separate sewage sludge reprocessing and power plant operation.

The invention may be performed in connection with fossil power plant processes which are operated with gaseous, liquid, and solid fuels. But it is particularly advantageous in connection with a power plant process on a hard coal basis.

The main field of application of the invention lies in the reprocessing of sewage sludge. Other solids, however, with a high water content, e.g. river, channel, or harbor sludge may naturally also be treated analogously.

Further explanations regarding the invention are found in the example shown schematically in the drawing.

BRIEF DESCRIPTION OF THE DRAWING

The drawing is a schematic representation of reprocessing sewage sludge.

DETAILED DESCRIPTION OF THE DRAWING

According to the process shown schematically in the drawing, raw sewage sludge with a water content up to 80% and more is fed via duct 1 first into an intermediate storage 2 and then via duct 3 into a dryer and is dried there until a residual water content below 20% is achieved. The dryer 4 may be a fluidized bed dryer or another known installation which is operated with steam. The dried sewage sludge is fed to an intermediate storage 5. Sewage sludge from the intermediate storage 5 is then ground in a mill 6 together with coal which is fed via duct 9, is dried more, and is then fed via duct 7 into the furnace zone 8 of a coal power plant and is burned there together with coal. The combustion air is fed via duct 10 to the furnace zone 8 which is in this case constructed as a dry combustor.

The combustion heat produced in the furnace zone 8 is transferred via heating surfaces 11 to the water-steam cycle of the power plant with turbine sections 12 and 13, a condenser 14, a feed water pump 15 as well as preheaters, feed water containers, etc. which are not shown here.

The flue gases 8 leaving the furnace zone 8 reach a reduction zone 17 where the nitric oxides are reduced. After this, the flue gases pass through an air preheater (not shown here) and are then dedusted in an electric filter 19 with ash output 20.

In installation parts 21 which are shown here only schematically, the flue gas is purified of hazardous substances such as SO$_2$ and possibly NOx and is then discharged into the atmosphere via installations not shown here.

The drying heat necessary in the dryer 4 is added via heat exchanger system 22. For this purpose, drawn off steam which is essentially already worked off is taken from a point downstream from the turbine section 12 via duct 23, is condensed in the heat exchanger system 22, and is again fed into the water-steam cycle of the power plant via duct 24. The steam volume remaining from turbine section 12 is passed via reducing damper 16 to the second turbine section 13. Hereby the pressure of the steam removed via duct 23 may be regulated via the reducing damper 16.

The exhaust vapors produced in the sewage sludge dryer which in addition to the water steam still contain combustible components are fed via duct 25 to the reduction zone 17 which is downstream from the furnace zone 8. In the reduction zone 17 the reducing components of the exhaust vapors together with other reducing medium streams which are passed through duct 18 are reacted with the nitric oxides of the flue gas. In order to burn the remaining combustible materials in the flue gas behind the reduction zone 17, combustion air is added via duct 27. After the flue gas has transferred its heat, it is removed via purification installations 19 and 21 of the power plant.

In order to compensate the exhaust vapor stream 25 and the furnace power 8, it is possible to temporarily condense excess exhaust vapors in an exhaust vapor condenser 28, store them in an exhaust vapor condensate collection container 29, and to feed them again via duct 30 to the dryer 4 when the proper furnace power is established so that they are evaporated there.

Dry sewage sludge and exhaust vapor condensate may also be removed from the storage 5 or the condensate collection container 29 to be used in other applications outside the power plant.

I claim:

1. A process for reprocessing sewage sludge using a fossil-fuel power plant comprising:
   initially drying the sewage sludge in indirect heat exchange with condensed steam from a steam generator of the power plant;
   supplying exhaust vapors produced during the drying process into a reduction zone of a combustion chamber of the power plant for reducing nitric oxides and other toxic substances;
   supplying the dried sewage sludge to a furnace zone of the combustion chamber of the power plant for burning the sewage sludge and thereby producing ash and exhaust gases.

2. The process of claim 1, further comprising mixing the exhaust gases formed by burning the sewage sludge with flue gases from the power plant.

3. The process of claim 2, further comprising passing the exhaust gas and flue gas mixture through a filter for dust-separation.

4. The process of claim 3, further comprising passing the exhaust gas and flue gas mixture through a purifier.

5. The process of claim 1, wherein the burning comprises burning the sewage sludge at temperatures above a melting point of the ash.

6. The process of claim 1, further comprising melting the ash produced during the burning of the sewage sludge using heat from hot flue gases of the power plant.

7. The process of claim 6, wherein the melting comprises melting the ash at different temperature levels.

8. The process of claim 1, further comprising grinding the sewage sludge together with the fossil-fuel of the power plant for supplying to the furnace zone of the power plant.

9. The process of claim 1, further comprising grinding the sewage sludge before supplying to the furnace zone of the combustion chamber of the power plant.

10. The process of claim 1, further comprising separately storing the sewage sludge and the exhaust vapors, both before and after drying, each in an intermediate storage means respectively.

* * * * *